United States Patent [19]
Yagi

[11] Patent Number: 5,129,859
[45] Date of Patent: Jul. 14, 1992

[54] AIRFLOW DISTRIBUTION CONTROLLING DEVICE FOR AUTOMOTIVE VEHICLE AIR CONDITIONING SYSTEM

[75] Inventor: Shigeru Yagi, Higashihiroshima, Japan

[73] Assignee: Mazda Motor Corporation, Hiroshima, Japan

[21] Appl. No.: 751,669

[22] Filed: Aug. 23, 1991

Related U.S. Application Data

[63] Continuation of Ser. No. 422,387, Oct. 16, 1989, abandoned.

[30] Foreign Application Priority Data

Oct. 15, 1988 [JP] Japan .............. 63-134008[U]

[51] Int. Cl.[5] .............................................. F24F 13/14
[52] U.S. Cl. .................... 454/155; 137/875; 454/152
[58] Field of Search ............ 98/2, 2.11; 137/875, 137/876; 454/152, 155

[56] References Cited

U.S. PATENT DOCUMENTS

| | | | |
|---|---|---|---|
| 2,982,255 | 5/1961 | Katzenberger | 137/875 |
| 3,331,394 | 7/1967 | Hefler et al. | 137/875 |
| 3,545,470 | 12/1970 | Paton | 137/875 X |
| 4,677,902 | 7/1987 | Tekemasa | 98/2.11 |
| 4,815,362 | 3/1989 | Ishizuka et al. | 137/875 X |
| 4,878,420 | 11/1989 | Ruby et al. | 137/875 X |

FOREIGN PATENT DOCUMENTS 241078 11/1911 Fed. Rep. of Germany ...... 137/875
61-110416 7/1986 Japan .

*Primary Examiner*—William E. Tapolcai
*Attorney, Agent, or Firm*—Fleit, Jacobson, Cohn, Price Holman & Stern

[57] ABSTRACT

An automotive vehicle air conditioning system has an air distributor duct branching off into first and second outlet ducts for delivering air in different directions, respectively and an air flow control device disposed at a junction where the distributor duct branches off into the two outlet ducts. The air flow control device consists of first and second air flow control members disposed side by side for deflecting air flows passing into the first and second outlet ducts, respectively, either one of the first and second air flow control members being actuated to deflect a flow of air passing therethrough so as to deliver air into the one of the first and second outlet ducts in a high proportion relative to air delivered into the other.

9 Claims, 3 Drawing Sheets

AIRFLOW DISTRIBUTION CONTROLLING DEVICE FOR AUTOMOTIVE VEHICLE AIR CONDITIONING SYSTEM

This is a continuation of application Ser. No. 07/422,387, filed Oct. 16, 1989, now abandoned.

BACKGROUND OF THE INVENTION

1. Field of the Invention

The present invention relates to an automotive vehicle air conditioning system, and more particularly to an airflow distribution controlling device for an automotive vehicle air conditioning system having a distributor duct branching off into two outlet ducts.

2. Description of Related Art

In an automotive air conditioning system having a distributor duct branching off into two outlet ducts for delivering air toward driver's and front passenger's seats, respectively, there is a requirement of delivering air through the two outlet ducts in various proportions. To deliver air in required proportions, a control door, which is provided at a junction for the two outlet ducts, closes partly or fully either one of the two outlet ducts when the other outlet duct is required to blow off a high proportion of air. Such an automotive vehicle air conditioning system is known from Japanese Unexamined Utility Model Publication No. 61-110,416 entitled "Ventilator", laid open Jul. 12, 1986.

The provision of a control door disposed at the junction for delivering air in required proportions to the outlet ducts causes an increase of fluid friction of air against the control door, resulting in not only increasingly loading a motor of a fan but also decreasing the amount of air delivered into a vehicle compartment. Such an increase of fluid friction of air also causes an increase of air pressure against the control door, resulting in an increased force of operating the control door to change the distribution of air into the two outlet ducts.

SUMMARY OF THE INVENTION

The primary object of the present invention is to provide an airflow distribution controlling device of an automotive vehicle air conditioning system for delivering conditioning air through two outlet ducts oriented in different directions in various proportions.

It is another object of the present invention to provide an airflow distribution controlling device of an automotive vehicle air conditioning system in which a control door deflects air to deliver it into two outlet ducts in required proportions without increasing the resistance of the control door against air and, thereby, without exerting large forces on the control door to operate it.

The objects of the present invention are achieved by providing an automotive vehicle air conditioning system having an air distributor duct branching off into first and second outlet ducts for delivering air in different directions, respectively, and an air control means disposed at a junction where the distributor duct branches off into the two outlet ducts. The air control means consists of first and second air orientation or flow deflection means disposed side by side at the junction for deflecting flows, i.e., orientations, of air passing into the first and second outlet ducts, respectively, either one of the first and second air flow deflection means being actuated to deflect a flow of air passing therethrough, thereby delivering air into the one of the first and second outlet ducts in a high proportion relative to air delivered into into the other of the first and second outlet ducts.

To deliver a high proportion of air into either one of the first and second outlet ducts, a member is operated to be moved in a direction in which the one of the first and second outlet ducts extends, thereby, causing the corresponding one of the first and second air flow deflection means to deflect the flow of air passing therethrough.

BRIEF DESCRIPTION OF THE DRAWINGS

Still other objects of the invention and more specific features will become apparent to those skilled in the art from the following description of the preferred embodiment, by way of example, considered together with the accompanying drawings wherein like reference characters have been used in the different figures to denote the same parts and in which.

DESCRIPTION OF THE PREFERRED EMBODIMENT

Because automotive vehicle air conditioning systems are well known, the present description will be directed in particular to elements forming part of, or cooperating directly with, a device in accordance with the present invention. It is to be understood that elements not specifically shown or described can taken various forms well known to those skilled in the art.

Figure 1:
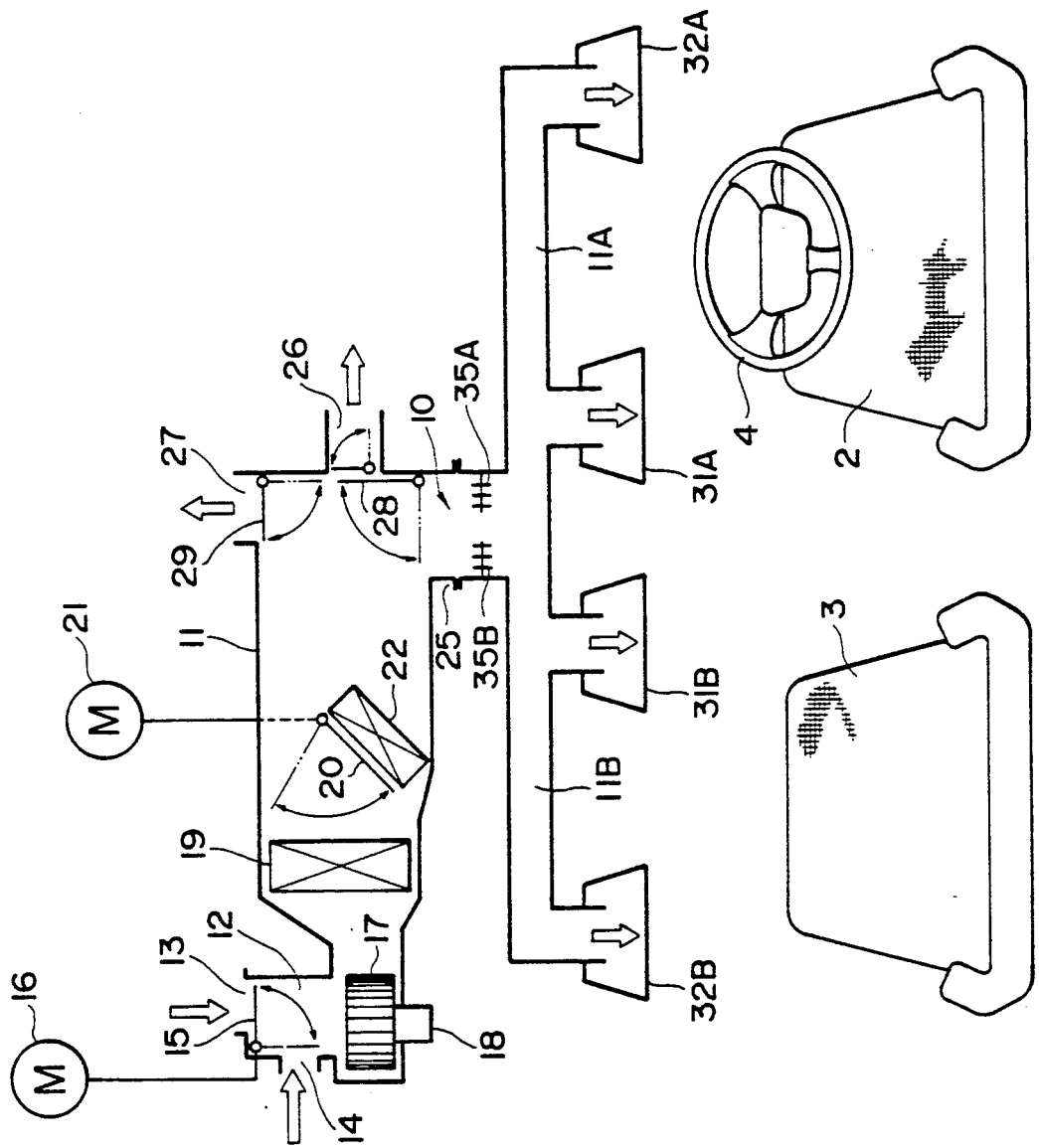
FIG. 1 is a schematic view of an automotive vehicle air conditioning system incorporating an airflow distribution controlling device in accordance with a preferred embodiment of the present invention.
Figure 2:
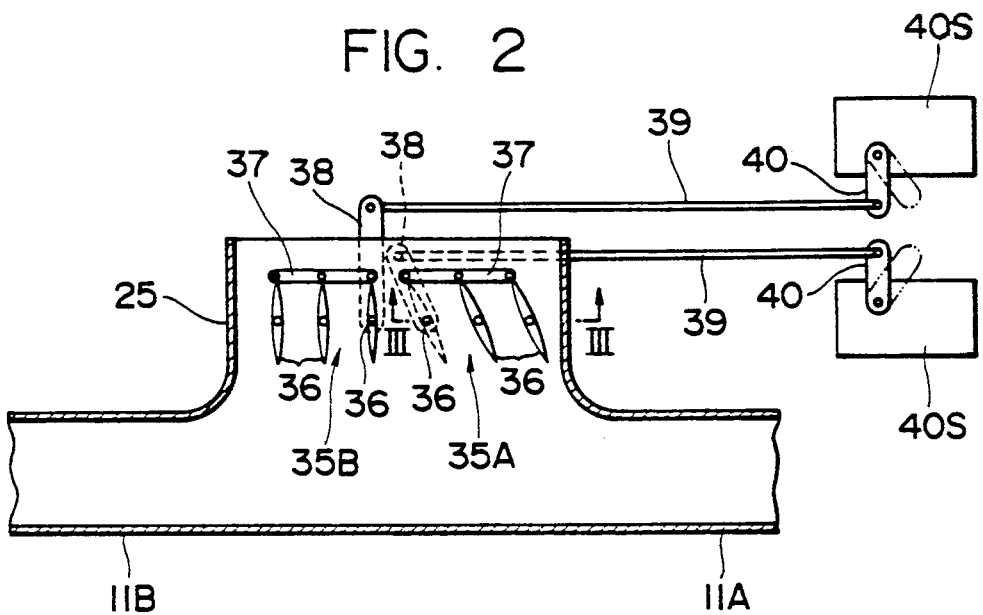
FIG. 2 is a plan view showing the airflow distribution controlling device shown in FIG. 1.

Referring to the drawings in detail, particularly to FIGS. 1 and 2, an automotive vehicle air conditioning system having an airflow distribution control device in accordance with a preferred embodiment of the present invention is shown and generally indicated by a reference numeral 10. The automotive vehicle itself is not shown, although purely diagrammatically, there is shown driver's and front passenger's seats 2 and 3 and a steering wheel 4.

The air conditioning system is located in the automotive vehicle and has an air distributor duct 11 branching off into two upper outlet ducts 11A and 11B for delivering air toward the driver's seat 2 and front passenger's seat 3, respectively. The air distributor duct 11 includes an air intake chamber 12 which is provided with two inlets 13 and 14. The inlet 13 is arranged to intake fresh air, while the inlet 14 is arranged to intake air which has been recirculated from the interior of the automotive vehicle. An air intake door 15 in the form of a flap, which is pivotally mounted in the intake chamber 12, is capable of pivotally moving from its solid line position shown in FIG. 1 to its broken line position along a path indicated by an arrow. The intake door 15 is controlled by a reversible electric motor 16, or otherwise may be manually operated by an driver, to fully open the recirculated air inlet 14 while fully closing the fresh air inlet 13 in its solid line position or to fully open the the fresh air inlet 13 while fully closing the recirculated air inlet 14 in its dotted line position.

All incoming air into the intake chamber 12, fresh or recirculated, is delivered into the air distributor duct 11 by means of a blower 17 which is driven by a continuously variable speed electric motor 18. The air from the blower 17 passes first through an evaporator core 19 disposed at the downstream side of the blower 17 in the air distributor duct 11. The evaporator core 19, as is well known in the art, cools the air delivered from the blower 17 for all ambient temperatures above the freezing point. In cooling the air, an uncontrolled proportion of moisture is extracted from the air and the amount of moisture so extracted will be dependent only upon the prevailing climatic conditions and the mass flow of the air. Some degree of air purification will take place as a result of the dehumidification process.

In the air distributor duct 11, air mixing means 20 in the form of a flap is disposed at the downstream side of the evaporator core 19 and is positionally controlled by means of a reversible electric motor 21. The air mixing flap 20 is pivotally settable at any position between the two extremes shown by solid and dotted lines wherein only cold air is delivered toward the lower reaches of the air distributor duct 11 or only heated air is delivered toward the lower reaches of the air distributor duct 11, respectively. The air mixing flap 20 is, however, changed in position between the two extremes to blend cold and heated air in various proportions, thereby producing a required outlet air temperature. Disposed adjacent to and at the downstream side of the air mixing flap 20 in the air distributor duct 11 is a heater core 22 in the form of a heat exchanger into which an engine coolant water is conducted to heat air passed therethrough.

The distributor duct 11 is further provided with connecting pipes 26 and 27 to which a defroster outlet duct and a lower outlet duct (not shown) are connected, respectively. In the distribution duct 11, there are pivotally mounted a defroster mode door 28 disposed between the connecting pipes 25 and 26 and a lower mode door 29 disposed between the connecting pipes 26 and 27. The defroster mode door 28 is capable of assuming two extreme positions shown, respectively, in full and broken lines in FIG. 1 in which heated or cold air is admitted to the upper outlet ducts 11A and 11B or to the defroster outlet duct. The lower mode door 29 is also capable of assuming two extreme positions shown respectively in full and broken lines in FIG. 1 in which heated or cold air is admitted to or prevented from admission to the lower outlet duct.

Figure 3:
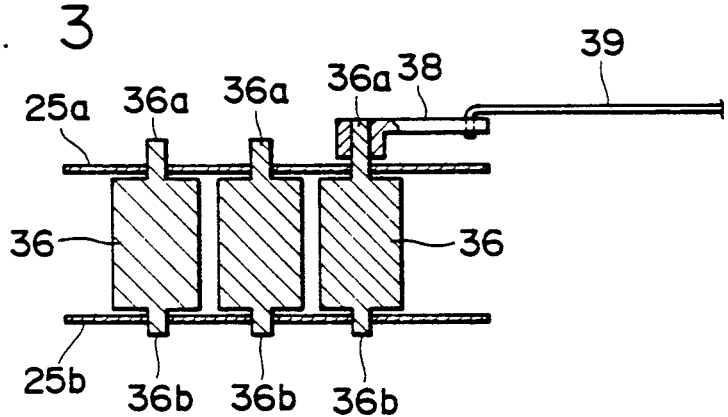
FIG. 3 is a cross-sectional view taken along line III—III of FIG. 2.
Figure 4:
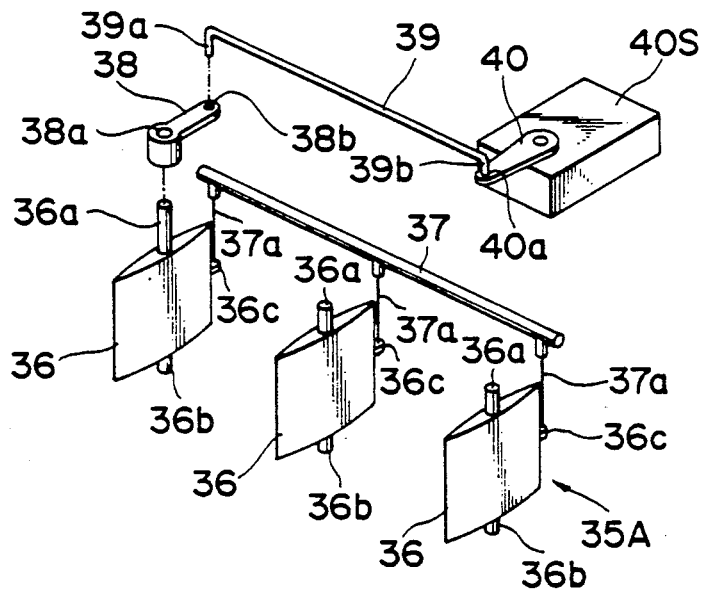
FIG. 4 is an exploded perspective view illustrating an air flow deflection unit.

The upper outlet ducts 11A and 11B includes first or right duct 11A and second or left, duct 11B into which the distributor duct 11 branches off and which are at right angles relative to a connecting pipe 25 and extend on both sides of and from the connecting pipe 25. The upper outlet ducts are connected with center and side outlet assemblies 31A and 32A, and 31B and 32B, respectively, opening to the interior of the automotive vehicle. In the connecting pipe 25, right or first and left or second air flow deflection units 35A and 35B of a pivotal louver type are arranged side by side. Because the right and left air flow deflection units 35A and 35B are similar to each other in structure and operation, the following description is directed to the air flow deflection unit 35A with reference to FIGS. 3 and 4. The air flow deflection unit 35A comprises a plurality of, for example three in this embodiment, fin blades 36 having a streamlined cross-section. The fin blades 36, each having upper and lower journals 36a and 36b, are supported by upper and lower walls 25a and 25b of the connecting pipe 25 for pivotal movement and operationally interconnected by a connecting rod 37. For this interconnection, the connecting rod 37 is provided with three thin, rigid connecting wires 37a which extend downward in parallel with one another. Each connecting wire 37a is coupled to a bracket 36c secured to an edge of the fin blade 36. A link arm 38 is formed with holes 38a and 38b at the both ends thereof, respectively. The link arm 38 is connected to the upper journal 36a of one of the fin blades 36 securely fitted in the hole 38a thereof. An operating rod 39 has hooked ends 39a and 39b pivotally received in the hole 38b of the link arm 38 and a hole 40a of an actuator arm 40 of a two position motor driven actuator 40S, respectively. The actuator arm 40a is turned between the two extreme positions shown in full line and broken line. In the illustrated full-line position, the motor driven actuators 40S shift the right air flow deflection unit 35A into its operative condition and the left air flow deflection unit 35B into its inoperative position, respectively. On the other hand, in the broken-line positions, the motor driven actuators 40S shift the right air flow deflection unit 35A into its inoperative condition and the left air flow deflection unit 35B into its operative position.

When the motor driven actuator 40S operates to turn the actuator arm 40 in a clockwise direction as viewed in FIG. 2, the link arm 38 is turned in the counterclockwise direction through the operating rod 39 so as to pivotally turn the fin blades 36 in the counterclockwise direction about the upper and lower journals 36a and 36b, thereby pivotally turning the fin blades 36 all at once in the same direction through the same angle. By controlling the operation of the motor driven actuator 40S, the fin blades 36 can be pivotally turned between their two extreme positions. The air flow deflection unit 35A, when pivotally turning the fin blades 36 at an angle, deflects the orientation or of air flowing therethrough. Note that all of the fin blades 36 are parallel to one another at any position. It is preferred to form a curved wall at a junction between the connecting pipe 25 and each outlet duct 11A, 11B so as to decrease the resistance of each outlet duct 11A, 11B against air flowing therethrough.

In operation of the air conditioning system having the airflow distribution control device in accordance with a preferred embodiment of the present invention, when the same proportion of air flow is required for the right and left outlet ducts 11A an 11B, both of the air flow deflection units 35A and 35B are controlled to direct all of the fin blades 36 at a right angle with respect to a direction in which the right and left outlet ducts 11A and 11B extend. The air from the distributor duct 11 passes undeflected through the air flow deflection units 35A and 35B straightforwardly.

When operating the motor driven actuator 40S for the right air flow deflection unit 35A, the fin blades 36 of the right air flow deflection unit 35A only are inclined at an angle toward the side wall of the connecting pipe 25 so as to deflect the flow of air, while the fin blades 36 of the left air flow deflection unit 35B are kept in parallel with the side wall of the connecting pipe 25 as shown in FIG. 2. As a result of the inclination of the fin blades 36 of the right air flow deflecting unit 35A, the air deflected by the inclined fin blades 36 flows therebetween increases the velocity of air into the right outlet duct 11B. The increase of velocity of air, which depends on angles at which the fin blades 36 incline, causes a drop of air pressure downstream the right air flow deflection unit 35A. Due to the drop of air pressure in the right outlet duct 11A, air passing to the left outlet duct 11B through the left air flow deflection unit 35B is partly drawn into and flows through the right outlet duct 11A, so as to increase the amount of air passing to the driver's seat through the outlet assemblies 31A and 32A of the right outlet duct 11A and accordingly, to decrease the amount of air passing to the front passenger's seat through the outlet assemblies 31B and 32A of the left outlet duct 11B. The same description is true for the left air flow deflection unit 35B. Thus, the air flow deflection units 35A and 35B effectively act to deliver air passing the right and left outlet ducts 11A and 11B in various required proportions according to various combinations of inclination angles for the fin blades 36 of the right and left air bearing deflection units 35A and 35B.

Figure 5:
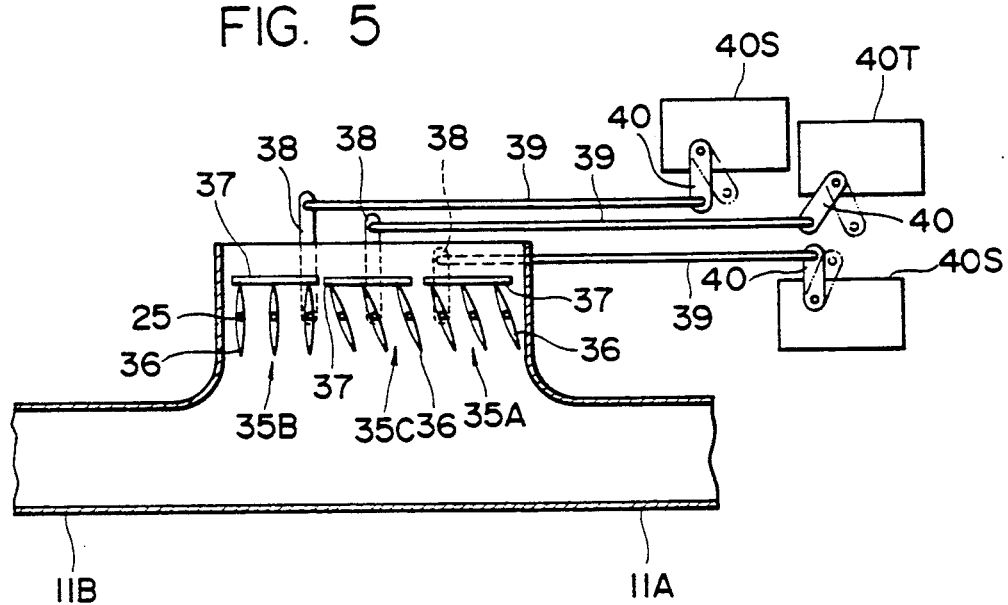
FIG. 5 is a plan view showing a variation of the airflow distribution controlling device shown in FIG. 2.
Figure 6:
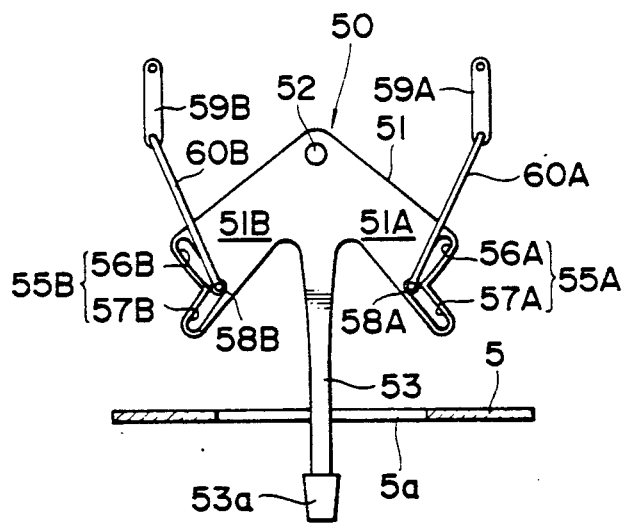
FIG. 6 is a plan view of a manual operating actuator for an airflow distribution controlling device in accordance with another preferred embodiment of the present invention, in which the air flow deflection unit is not operated.
Figure 7:
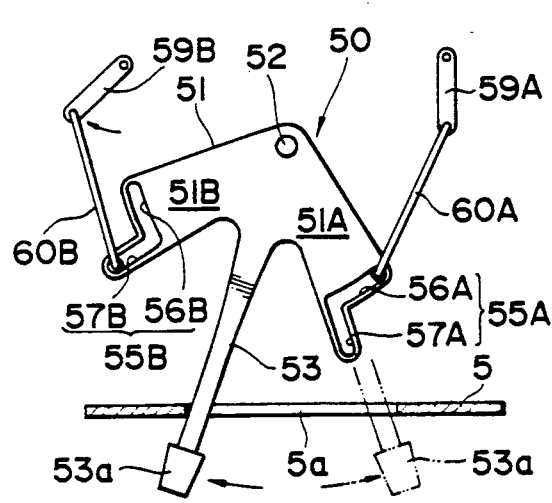
FIG. 7 is a plan view, similar to FIG. 6, in which the air flow deflection unit is operated.

In an alternate embodiment shown in FIG. 5, the airflow distribution controlling device for an automotive air-conditioning system is provided with a third or center air flow deflection unit 35C in addition to the left and right air flow deflection units 35A and 35B. The center air flow deflection unit 35C, which is disposed between the right and left air flow deflection units 35A and 35B and actuated by a three position motor operated actuator 40T, is basically the same in structure as the right and left air flow deflection units 35A and 35, but has two operative positions. That is, the motor operated actuator 40T is synchronized with the motor operated actuators 40S so as to shift the center air flow deflection units 35C in such a way as to deflect air to the same direction as either of the right and left air flow deflection units 35A and 35B when the one of the right and left air flow deflection units 35A and 35B is shifted into its operative position or to maintain the center air flow deflection units 35C in its inoperative or neutral position when both of the right and left air flow deflection units 35A and 35B are maintained in their inoperative positions where air passing therethrough is proportioned. Although, in the automotive vehicle air conditioning system in the above preferred embodiment, the air flow deflection unit is operated by the motor driven actuator, nevertheless, a manually operable actuator such as that shown in FIGS. 6 and 7 may be incorporated in the air conditioning system shown in FIG. 1. As shown in FIGS. 6 and 7, a manually operable actuator generally indicated by a reference numeral 50 has a generally T-shaped, three position rocker lever 51 pivotally mounted on a mounting bush 52. The rocker lever 51 is provided with a handle 53 with a knob 53a which extends passing through a slot 5a formed in a control panel 5 to the interior of the automobile vehicle so as to be operated either from the driver's seat 2 or from the passenger's seat 3. The rocker lever 51 is further provided with right and left wings 51A and 51B which are, respectively, formed with control cam grooves 55A and 55B symmetrical with respect to a straight line passing through the rocking pin 52.

The control cam grooves 55A and 55B consist of circular arcuate cam grooves 56A and 56B and straight cam grooves 57A and 57B extending from lower ends of the circular arcuate cam grooves 57A and 57B, respectively. The circular arcuate cam grooves 56A and 56B form parts of circles having their center on a axial centerline of the mounting bush 52, and the radially extending cam grooves 57A and 57B lie on straight lines passing the axial centerline of the mounting bush 52, respectively. The control cam grooves 55A and 55B slidably receive therein cam followers 58A and 58B, respectively, connected to one ends of link rods 60 similar to the link rods 38 in the above described embodiment. The operating rod 60 are connected at their other ends to the operating rod 39 of the air flow deflection units 35A and 35B, respectively.

To proportion the respective amounts of air passing into the right and left outlet ducts 11A and 11B, the handle 53 is positioned in an intermediate position shown in FIG. 6 between the two extremes one of which is shown in FIG. 7. When the handle 53 is in the intermediate position, the cam followers 58A and 58B are at junctions of the circular arcuate cam grooves 56A and 56B and the straight cam grooves 57A and 57B of the control cam grooves 55A and 55B, respectively, so as not to incline the fin blades 36 of the right and left air flow deflection units 35A and 35B, thereby proportioning the respective amounts of air passing to the right and left outlet ducts 11A and 11B.

When operating the lever 53 to one of the two extremes, such as shown in FIG. 7, to turn the T-shaped operating lever 51 about the pin 52 in a clockwise direction as viewed in FIG. 7, the cam follower 58A slides within the circular arcuate cam grooves 56A, so as not to force the interconnecting arm 38 of the right air flow deflection unit 35A through the operating rod 60, thereby causing no change in the amount of air passing into the right outlet duct 11A. At this time, the cam follower 58B, however, slides within the straight cam grooves 57B, so as to force the interconnecting arm 38 of the left air flow deflection unit 35B through the operating rod 60 to turn only in the clockwise direction, thereby deflecting the orientation or of air passing through the inclined fin blades 36 of the left air flow deflection unit 35A and thereby increase the velocity of air passing through the left air flow deflection unit 35A to the left outlet duct 11B. As a result, in the same way as described for the air conditioning system in accordance with the previous embodiment, air is delivered to the left outlet duct 11B in an increased proportion but to the right outlet duct 11A in a reduced proportion. It is apparent from the previous description that when operating the lever 53 to the other of the two extremes to turn the T-shaped operating lever 51 about the pin 52 in a counterclockwise direction as viewed in FIG. 6, air is delivered to the right outlet duct 11A in an increased proportion but to the left outlet duct 11B in a reduced proportion.

It should be noted that various changes and modifications are apparent to those skilled in the art which are within the scope of the invention, and such changes and modifications are intended to be covered by the following claims.

What is claimed is:

1. An air conditioning system for an automotive vehicle comprising:

an air distributor duct branching off into first and second outlet ducts for delivering air in different directions, respectively; and first and second air flow deflection means disposed side by side at a junction from which said air distributor duct branches off into said first and second outlet ducts for deflecting flows of air passing through said first and second air flow deflection means and into said first and second outlet ducts, respectively, either of said first and second air flow deflection means being operable to deflect one of the flows of air passing through said first and second air flow deflection means to one of said first and second outlet ducts while the other of said first and second air flow deflection means is not operated so that another of the flows of air passing through said first and second outlet ducts is not deflected by either of said first and second air flow deflection means and relative proportions of air passing through said first and second outlet ducts are changed without shutting off air flow through either of the first and second outlet ducts.

2. An air conditioning system as defined in claim 1, wherein each said air flow deflection means includes a plurality of fin blades each of which is supported by and in said air distributor duct at said junction for pivotal movement, said fin blades being arranged parallel to one another and operationally coupled together so as to undergo integral pivotal movement, thereby deflecting air flowing between said fin blades to said one of said first and second outlet ducts.

3. An air conditioning system as defined in claim 2, wherein each of said fin blades is shaped so as to have a streamlined cross-section which increases a flow rate of air flowing through said first and second air flow deflection means, thereby creating a pressure drop in said one of said first and second outlet ducts.

4. An air conditioning system as defined in claim 3, further comprising operation means for bringing said first and second air flow deflection means into operation independently from each other.

5. An air conditioning system as defined in claim 4, wherein said operation means comprises a manually operable member shiftable between two extreme positions in opposite directions in which said first and second outlet ducts extend, respectively, said manually operable member being shifted to one of said two extreme positions in one of said opposite directions in which one of said first and second outlet ducts, to which a high proportion of air is to be delivered, extends.

6. An air conditioning system as defined in claim 5, wherein said manually operable member comprises a three position toggle lever having a center position and said two extreme positions on both sides of said center position, said center position being for maintaining said first and second air flow deflecting means ineffective, with said two extreme positions bringing said first and second air flow deflection means into effective operation, respectively.

7. An air conditioning system as defined in claim 6, wherein said three position toggle lever is formed with symmetrical control cam grooves at equal angles on each side of a straight line passing an axial centerline of a mounting bushing, therefor each control cam grooves consisting of a circular arcuate cam section having a center at said centerline and a straight cam section extending in a straight line passing said centerline.

8. An air conditioning system for an automotive vehicle comprising:

an air distributor duct branching off into first and second outlet ducts for delivering air in different directions, respectively;

first and second air flow deflection means disposed side by side at a junction where said air distributor duct branches off into said first and second outlet ducts for deflecting flows of air passing into said first and second outlet ducts, respectively, either one of said first and second air flow deflection means for one of said first and second outlet ducts into which air is to be delivered in a high proportion relative to air to be delivered into the other being operated to deflect a flow of air passing therethrough to said one of said first and second outlet ducts, each said air flow deflection means including a plurality of fin blades each of which is supported by and in said air distributor duct at said junction for pivotal movement, said fin blades being arranged in parallel with one another and operationally coupled together so as to cause their integral pivotal movement thereof, thereby deflecting a flow of air between said fin blades to said one of said first and second outlet ducts into which air should be delivered in a high proportion relative to air to be delivered into the other, each said fin blade being shaped to have a streamlined cross-section so as to increase a flow rate of air flowing therethrough, thereby creating a pressure drop in said one of said first and second outlet ducts; and operation means for bringing said first and second air flow deflection means into operation independently from each other, said operation means comprising a motor operated actuator shiftable between two extreme positions in opposite directions in which said first and second outlet ducts extend, respectively, and shifting to either one extreme position in one of said opposite directions in which extends one of said first and second outlet ducts to which a high proportion of air is to be delivered.

9. An air conditioning system for an automotive vehicle as defined in claim 8, further comprising a third air flow deflection means disposed between said first and second air flow deflection means, said third air flow deflection means being operated by a motor operated actuator to shift to three positions and being in cooperation with either one of said first and second air flow deflection means to shift to the same position as said one of said first and second air flow deflection means.

* * * * *